US006085938A

United States Patent [19]

Coughlin

[11] Patent Number: 6,085,938

[45] Date of Patent: Jul. 11, 2000

[54] MEDICAMENT DISPENSING CELL

[75] Inventor: Shane P. Coughlin, Kansas City, Mo.

[73] Assignee: Scriptpro LLC, Mission, Kans.

[21] Appl. No.: 09/255,923

[22] Filed: Feb. 23, 1999

Related U.S. Application Data

[63] Continuation-in-part of application No. 08/897,727, Jul. 21, 1997.

[51] Int. Cl.[7] .................... B65G 49/00

[52] U.S. Cl. .................... 221/203; 221/277; 198/453

[58] Field of Search .................... 221/135, 200, 221/203, 239, 241, 258, 266, 277, 163, 166, 168; 453/53, 57; 198/453, 454

[56] References Cited

U.S. PATENT DOCUMENTS

| | | | |
|---|---|---|---|
| 1,128,561 | 2/1915 | Webendorfer . | |
| 2,137,501 | 11/1938 | Myers | 453/57 |
| 2,690,856 | 10/1954 | Trondle . | |
| 3,277,998 | 10/1966 | Medoff | 221/168 |
| 3,603,327 | 9/1971 | Buchholz et al. | 453/57 |
| 3,746,211 | 7/1973 | Burgess, Jr. . | |
| 4,284,301 | 8/1981 | Geiger et al. . | |
| 4,615,350 | 10/1986 | Boudville | 453/57 |
| 4,660,824 | 4/1987 | Hermkens et al. . | |
| 4,753,473 | 6/1988 | Arnett . | |
| 4,810,230 | 3/1989 | Shirasawa . | |
| 4,872,803 | 10/1989 | Asakawa . | |
| 4,902,263 | 2/1990 | Ito et al. . | |
| 5,033,785 | 7/1991 | Woolley, Jr. . | |
| 5,082,268 | 1/1992 | Santoro . | |
| 5,332,275 | 7/1994 | Conway et al. . | |
| 5,337,919 | 8/1994 | Spaulding et al. . | |
| 5,873,488 | 2/1999 | Guerra . | |
| 5,897,024 | 4/1999 | Coughlin et al. | 221/203 |

FOREIGN PATENT DOCUMENTS

| | | |
|---|---|---|
| 53-145260 | 12/1978 | Japan . |
| 59-43743 | 10/1984 | Japan . |
| 918086 | 4/1982 | Sudan . |

*Primary Examiner*—H. Grant Skaggs
*Attorney, Agent, or Firm*—Hovey, Williams, Timmons & Collins

[57] ABSTRACT

A medicament dispensing cell for use in an automatic dispensing machine includes a housing defining a medicament storage section, a discharge section leading to an outlet, a passage between the sections, a rotatable platen and a dispensing assembly for dispensing medicament in single file from the storage section to the discharge section. A pair of resilient, spacing fingers extend from the outboard wall of the discharge section and are positioned to guide medicament units around the distal end thereof in order to space medicament units during rotation of the platen.

10 Claims, 5 Drawing Sheets

110
12
22
50
44
92
98
112
114
116
118
120
122

MEDICAMENT DISPENSING CELL

RELATED APPLICATIONS

This application is a continuation-in-part of application Ser. No. 08/897,727, filed Jul. 21, 1997, entitled MEDICAMENT DISPENSING CELL.

BACKGROUND OF THE INVENTION

1. Field of the Invention

The present invention relates to the field of automatic medicament dispensing machines. In particular, the invention is concerned with a medicament dispensing cell for use in an automatic dispensing machine.

2. Description of the Prior Art

U.S. Pat. No. 5,337,919 discloses an automatic medicament dispensing machine having a plurality of dispensing cells for storing and dispensing various types of solid medicament units such as pills, capsules and caplets. Each cell includes a rotatable platen presenting a driven gear. A manipulator arm of the machine retrieves an empty vial and positions the vial adjacent the outlet of a selected dispensing cell. The manipulator arm includes a drive gear that engages the driven gear of the cell for selective rotation thereof in order to dispense medicament from the cell. The filled vial is then positioned on a discharge conveyor for subsequent handling such as labeling and inspection.

While generally adequate, the dispensing cell as disclosed in the '919 patent presents some problems. For example, medicament units sometimes cling to the housing of the cell or to one another due to static charge or moisture. Additionally, medicament units are sometimes dispensed without adequate spacing therebetween resulting in an inaccurate count by the photoelectric eye on the manipulator arm. Breaking and jamming of medicament units has also been a problem. All of these factors have contributed to a dispensing speed slower than that desired.

SUMMARY OF THE INVENTION

The present invention solves the prior art problems discussed above and provides a distinct advance in the state of the art. In particular, the dispensing cell hereof eliminates static charge problems and ensures reliable dispensing of medicament units with sufficient spacing for an accurate count.

The preferred dispensing cell for use in an automatic medicament dispensing machine includes the housing, a rotatable platen, and a dispensing assembly. The walls of the housing define a storage section, a discharge section leading to an outlet, and a passage therebetween. A pair of resilient, spacing fingers extend from the outboard wall of the discharge section and are configured to guide medicament units around the distal ends of the fingers in order to space the medicament units into a single file arrangement. In preferred forms, the fingers include a notch in the lower edge thereof sized to allow passage of only one medicament unit at a time in order to eliminate stacked medicament units.

DETAILED DESCRIPTION OF THE PREFERRED EMBODIMENT

Figure 1:
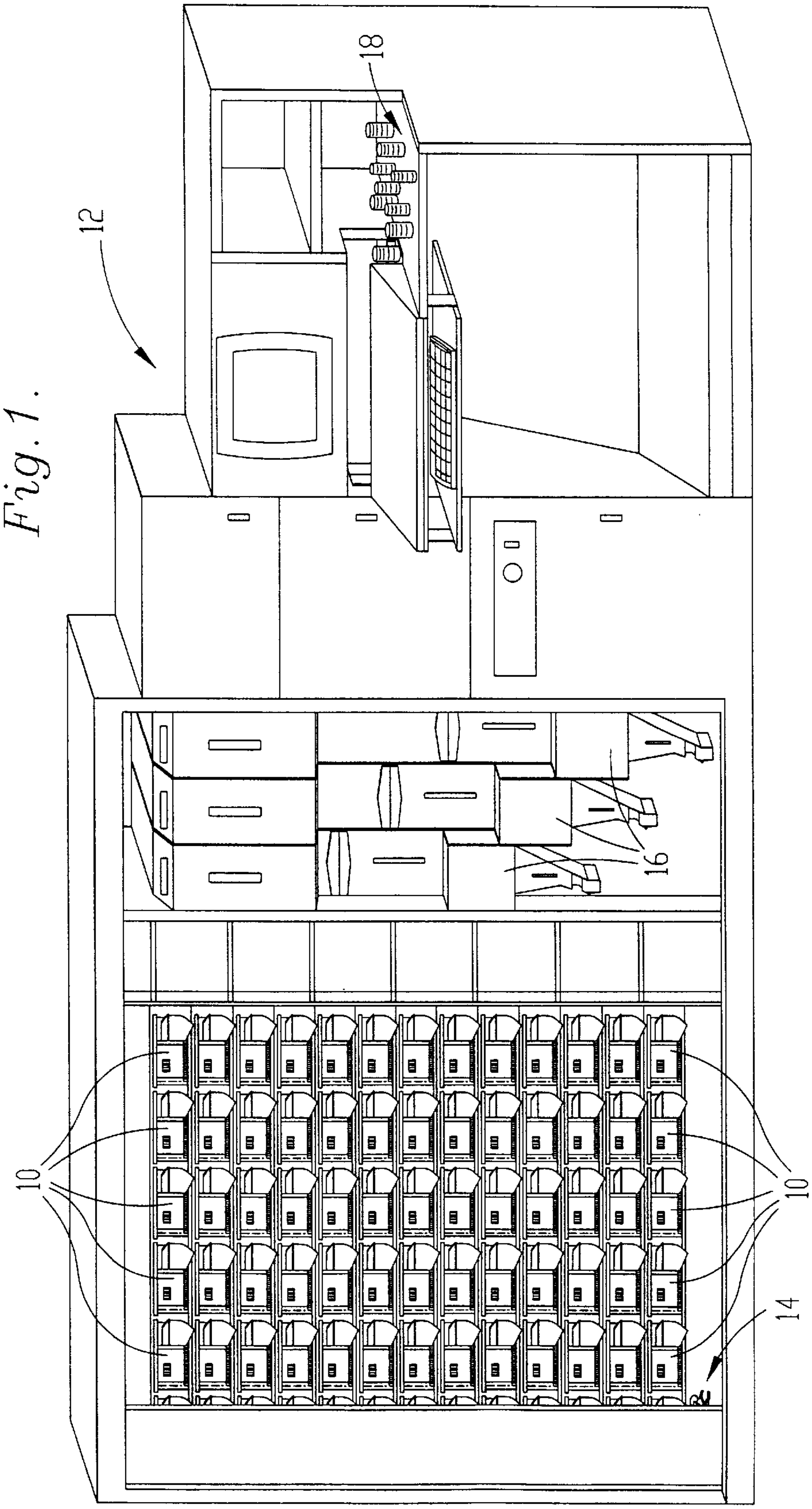
FIG. 1 is a pictorial view of a plurality of the preferred medicament dispensing cells in accordance with the present invention shown as part of an automatic medicament dispensing machine.
Figure 3:
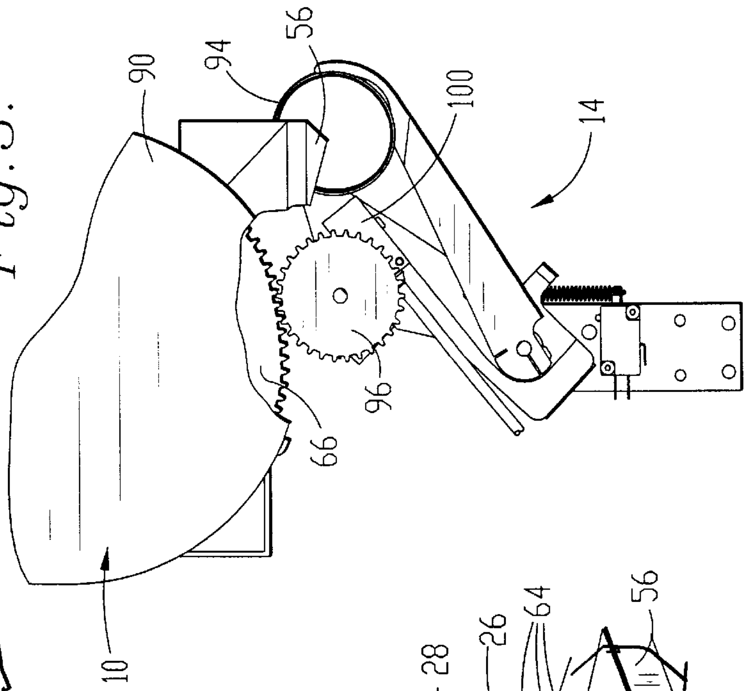
FIG. 3 is a left, top pictorial view of the cell and mechanism of FIG. 2 with portions cut away for clarity of illustration.
Figure 2:
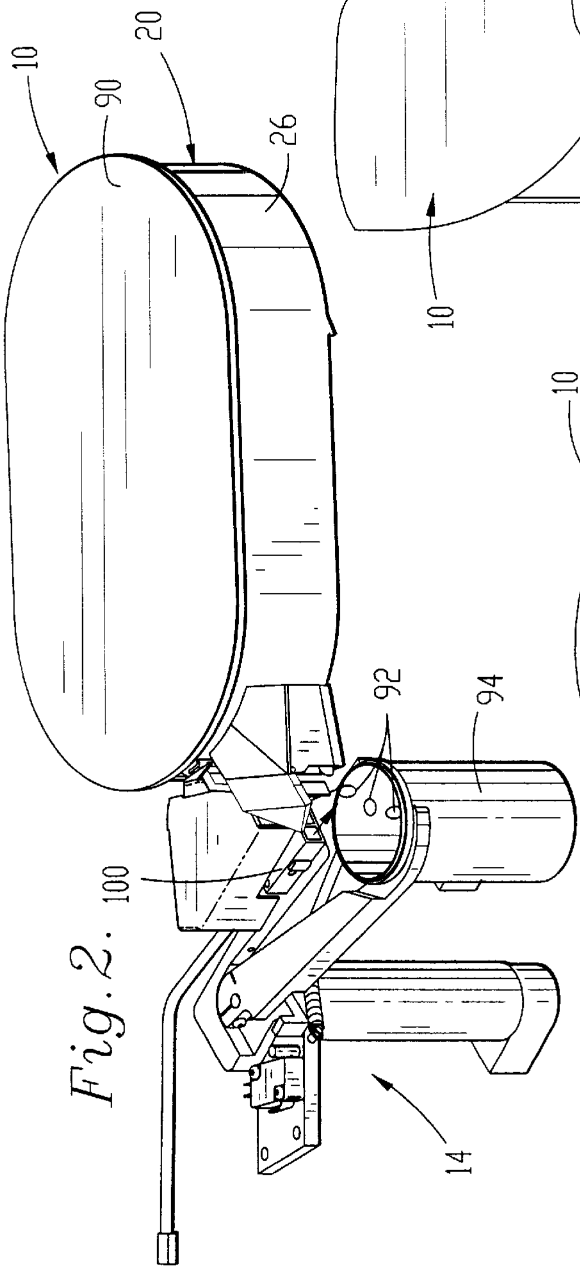
FIG. 2 is a left side pictorial view of a dispensing cell of FIG. 1 shown engaged by the vial manipulator mechanism of the dispensing machine of FIG. 1.
Figure 4:
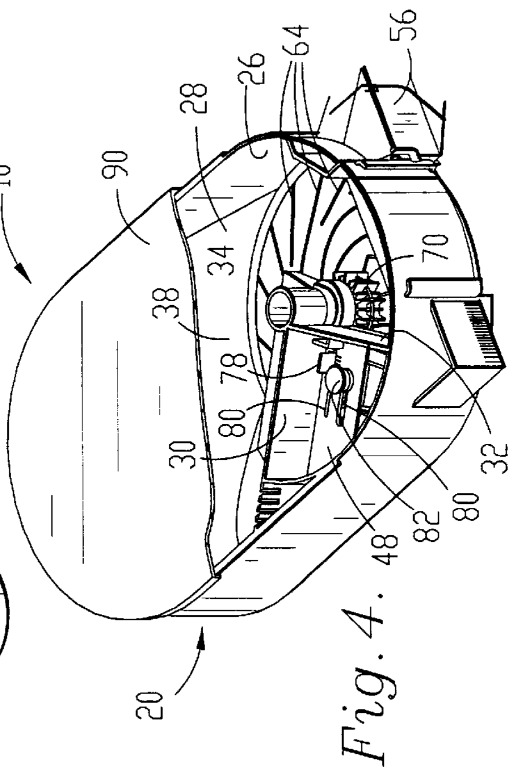
FIG. 4 is a right, front pictorial view of the dispensing cell of FIG. 1 with portions cut away for clarity of illustration.

FIG. 1 illustrates a plurality of preferred medicament dispensing cells 10 in accordance with the present invention shown in use as part of an automatic medicament dispensing machine 12 such as that disclosed in U.S. Pat. No. 5,337,919, incorporated by reference as part of the disclosure hereof. In general, machine 12 includes a manipulator mechanism 14 (see also FIGS. 2 and 3) that retrieves an empty vial from one of the vial dispensers 16, places the empty vial adjacent a selected dispensing cell 10 for receipt of medicament therefrom, and then places the filled vial on a conveyor for labeling and subsequent inspection at inspection station 18. Preferred dispensing cell 10 broadly includes housing 20, platen 22 and dispensing assembly 24.

Referring to FIGS. 2–10, housing 20 presents an elongated elliptical configuration and includes circumscribing side wall 26, sloped bottom wall 28, brace wall 30, guide wall 32 and central hub wall 34. Side wall 26 and bottom wall 28 define central opening 36 with platen 22 received therein. Side wall 26, bottom wall 28 and brace wall 30 define medicament storage section 38. Sloped cover wall 40 extends from brace wall 30 into storage section 38 and is spaced above platen 22 to define passage inlet 42.

Figure 5:
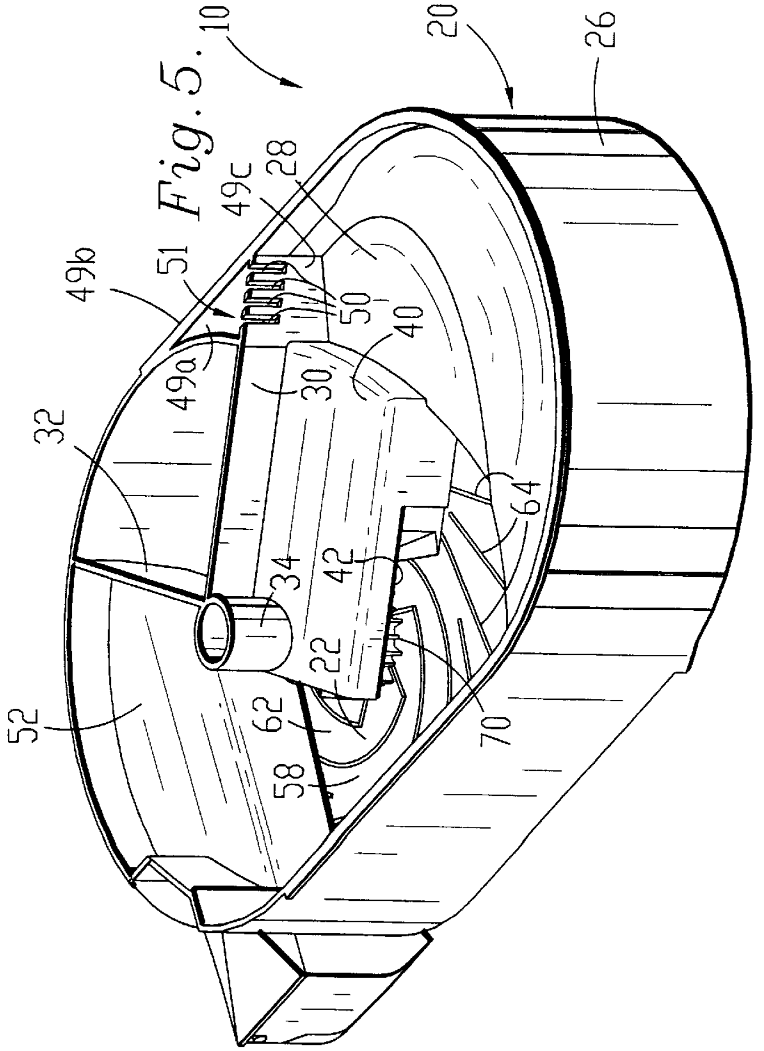
FIG. 5 is a left, rear pictorial view of the dispensing cell of FIG. 1 with the cover removed.
Figure 10:
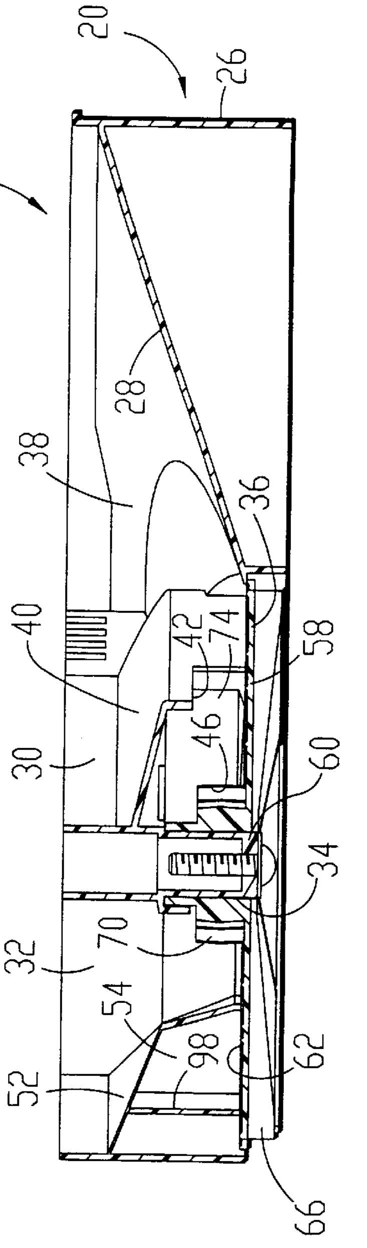
FIG. 10 is a sectional view taken along line 10—10 of FIG. 7.
Figure 8:
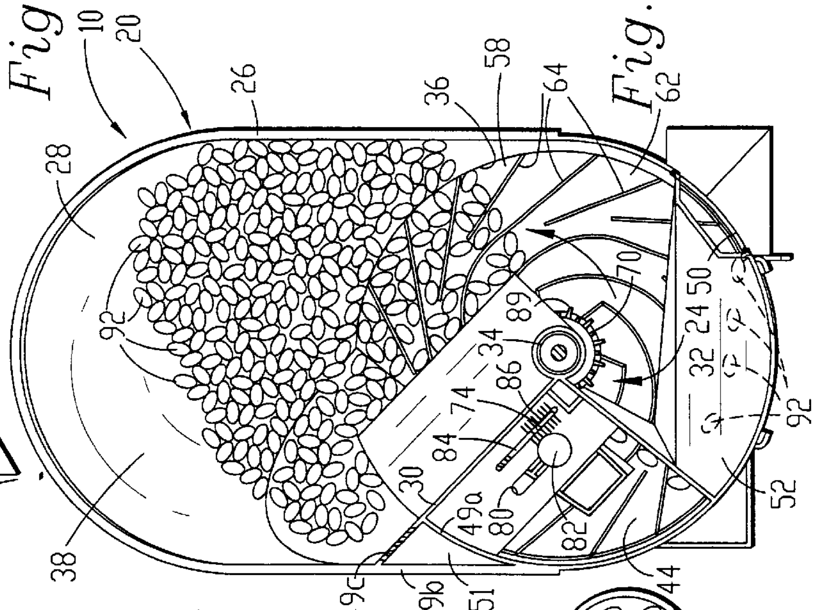
FIG. 8 is a top plan view of the dispensing cell of FIG. 1 with the cover removed.

Side wall 26, brace wall 28 and guide wall 32 define discharge section 44. Medicament passage 46 extends between storage section 38 and discharge section 44 under brace wall 30. Support wall 48 extends from brace wall 30 into discharge section 44 over passage 46 and between side wall 26 and guide wall 32. As best shown in FIGS. 5 and 8, side wall 26 also includes wall sections 49*a*, 49*b* and 49*c* defining chamber 51 configured for receiving desiccant packets therein in order to prevent moisture accumulation in cell 10. Wall section 49*c* includes a plurality of slots 53 defined therein for air exchange between the desiccant received in chamber 51 and storage section 38.

Housing 20 also includes outlet 50 with outlet wall 52 extending inwardly from side wall 26 to define outlet channel extending between discharge section 44 and outlet 50. Gate 56 is pivotally mounted adjacent outlet 50.

Platen 22 integrally includes disk-shaped platen body 58 and central hub 60 rotatably received in central hub wall 34. Platen body 50 presents upper surface 62 and includes a plurality of medicament conveying ribs 64 extending from the surface thereof configured in a generally spiral pattern extending from hub 60. The lower surface of platen body 58 is configured to present driven gear 66. Platen 22 is preferably composed of conductive material such as 899A69584 FS 23156 available from the RTP Company for reducing any static charge that might accumulate among the components of cell 10 and any medicament stored therein.

Dispensing assembly 24 includes dispensing structure 68 and bushing 70 positioned about platen central hub 60. Dispensing structure 68 includes passage wall 72 spaced from bushing 70 and spaced from guide wall 32, and includes funnel wall 74 extending into storage section 38 for funneling medicament therefrom into passage 46. Dispensing structure 68 also includes upstanding, threaded stud 76 and upstanding position-indicating tab 78. Stud 76 extends through stud slot 80 defined in support wall 48 and threadably receives thumbscrew 82. With thumbscrew 82 loose, dispensing structure 68 can be shifted to present a selected width for passage 46 and then retightened for holding structure 68 in the selected position.

Tab 78 extends through a corresponding tab slot 84 defined in support wall 48. A plurality of passage-width indicia 86 in the nature of spaced lines defined on support wall 48 adjacent tab slot 84 for indicating the position of tab 78 and thereby indicating the position of structure 68 and the width of passage 46.

Bushing 70 is preferably composed of flexible, resilient material such as KRATON or SANOPRENE thermal plastic elastomer and presents a plurality of outwardly extending fingers 88. The rotation of platen 18 and bushing 70 along with fingers 88 convey units of medicament from storage section 38 into passage 46.

Figure 9:
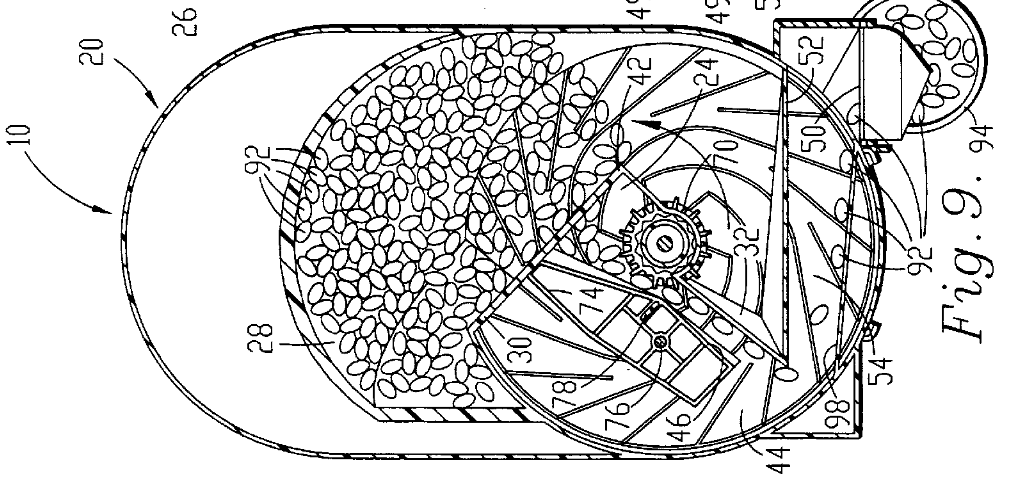
FIG. 9 is a sectional view taken along line 9—9 of FIG. 6.

In use, cover 90 is removed from housing 20. Storage section 38 is then filled with a selected medicament such as pills, capsules, or caplets 92 as illustrated in FIGS. 8 and 9. Sloped cover wall 40 supports the weight of the medicament units positioned above dispensing assembly 24 and provides a constant head of medicament units to the entrance of passage 46. This feature contributes to more reliable and accurate dispensing of medicament units and also aids in the prevention of jamming and breakage.

The width of passage 46 is then adjusted by loosening thumbscrew 82 and shifting dispensing structure 68 to a selected location as indicated by tab 78 and indicia 86 corresponding to the desired width of passage 46. Thumbscrew 82 is then retightened and cover 90 replaced.

It is preferred that dispensing structure 68 be adjusted so that units of medicament emerge from passage 46 substantially in single file. For example, caplet 92 presents a thickness, a length as the major axis, and a breadth as the minor axis. It is preferred that dispensing structure be adjusted so that the width of passage 46 is greater than the breadth of an individual medicament unit, but less than twice the breadth. With this spacing, a caplet 92 entering passage 46 with its length transverse thereto will be turned by bushing 70. Once aligned, the width of passage 46 is sufficient for unrestricted movement of caplets 92 but narrow enough to prevent the caplets from turning or wedging.

In the operation of dispensing cell 10 as part of dispensing machine 12, manipulator mechanism 14 presents an empty vial 94 below outlet 50. In this position, drive gear 96 of mechanism 14 engages driven gear 66 of platen body 58. Rotation of drive gear 92 causes rotation of platen 22 in the counter-clockwise direction as illustrated in FIGS. 8 and 9.

With rotation of platen 22, conveying ribs 64 sweep caplets 92 toward passage inlet 42 and along funnel wall 74 into passage 46. The configuration of funnel wall 74 gradually narrows the approach toward passage 46 which tends to align caplets 92 along the major axes thereof. As caplets 92 pass along funnel wall 74, bushing 70 engages, separates and moves caplets 92 into passage 46. The flexible and resilient nature of bushing 70 significantly contributes to the prevention of medicament breakage and jamming while helping propel medicament units through passage 46. As will be appreciated, round medicament such as pills need not be aligned axially, but bushing 70 aids in aligning the pills in single file and spacing them along passage 46. The resilient and flexible nature of bushing 70 provides for gentle handling of medicaments thereby minimizing breakage and abrasion.

The rotation of platen 22 moves caplets 92 through passage 46. The spiral orientation of conveying ribs 64 assists in this movement but also moves caplets 92 against guide wall 32. This helps maintain caplets 92 in a single file orientation. Additionally, ribs 64 prevent medicament units sliding or rolling on platen 18 without being propelled toward outlet 50. This is an important factor in preventing jamming of medicament units. Moreover, as caplets 92 move toward the periphery of platen 18, their velocities increase which further spaces caplets 92 from one another.

As caplets 92 emerge from passage 46 and pass beyond the end of guide wall 32, platen 22 carries them into outlet channel 54. The configuration of conveying ribs 64 sweeps the capsules toward the periphery of platen 22 until they engage channel wall 98. The rotation of platen 18 carries caplets 92 along channel wall 98 and maintains the spacing as caplets 92 are dispensed through outlet 50. In this way, caplets 92 are dispensed one at a time allowing the photoelectric eye 100 on manipulator mechanism 74 to achieve an accurate count.

Figure 6:
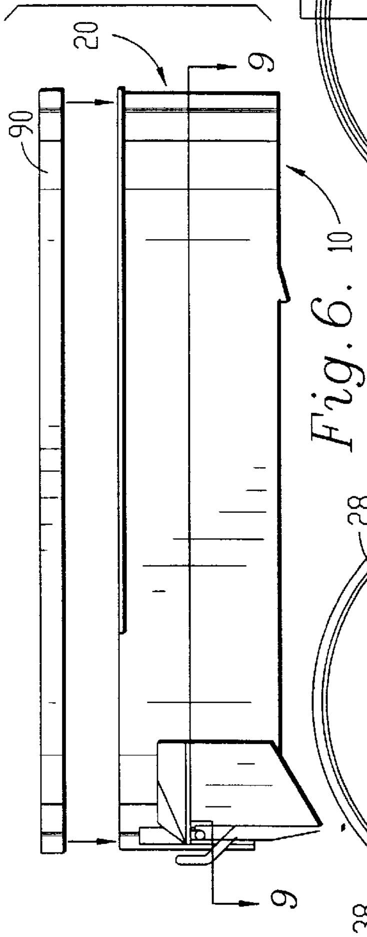
FIG. 6 is a left, elevational view of the dispensing cell of FIG. 1 showing the cover in spaced relationship.
Figure 7:
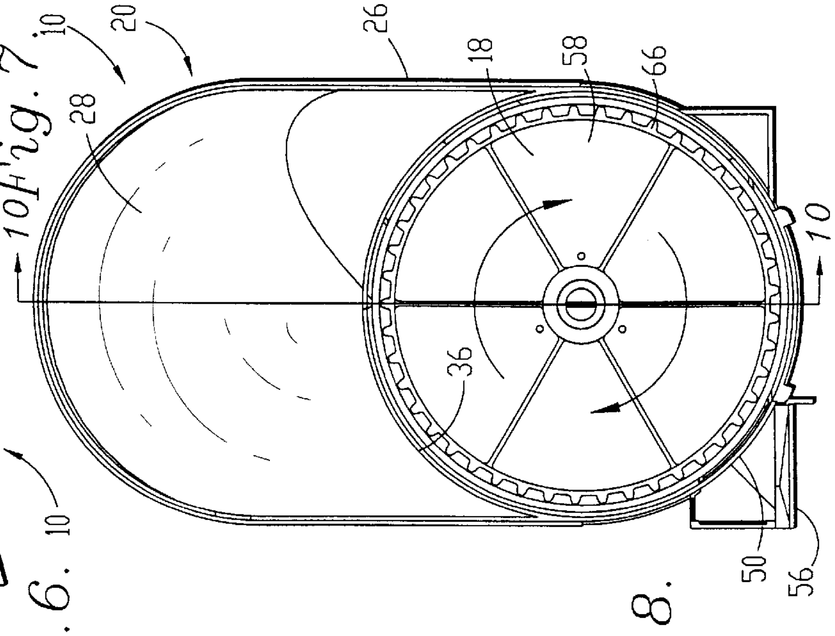
FIG. 7 is a bottom plan view of the dispensing cell of FIG. 1.

Turning to FIG. 6, housing 20 also includes tab 102 extending from the bottom thereof and configured for reception in a corresponding notch 104 defined in the support shelf 106 for dispensing cell 10. When a cell is installed in machine 12, notch 102 slides until it drops into notch 104 providing a positive indication that cell 10 is properly positioned.

SECOND EMBODIMENT

FIGS. 11–14 illustrate medicament dispensing cell 110 as another embodiment of the present invention. Cell 110 includes components similar to cell 10 and similar components bear the same numerical designations.

Figures 11, 12, 13, 14:
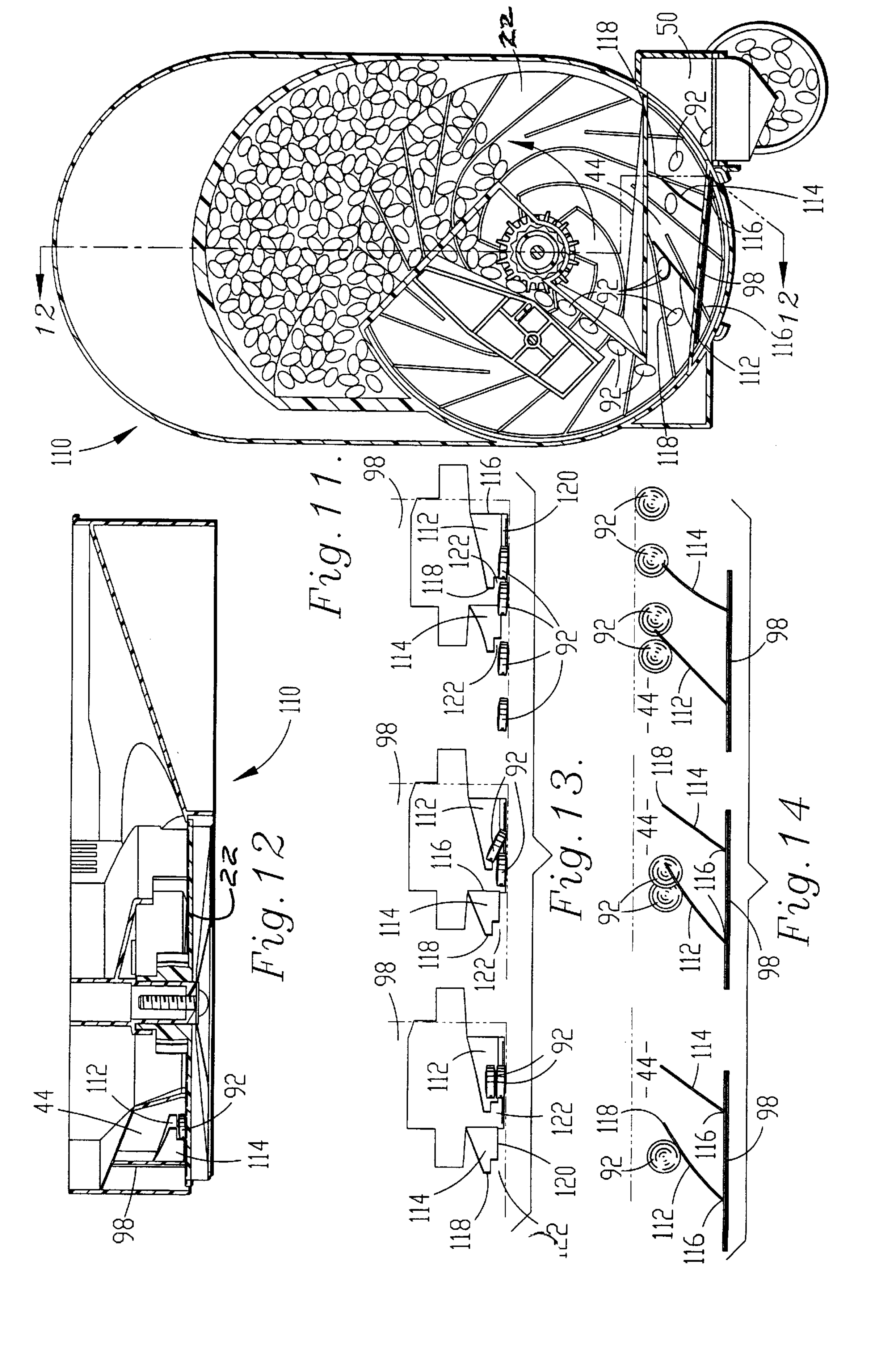
FIG. 11 is a plan view of another embodiment of the preferred medicament dispensing cell in accordance with the present invention.
FIG. 12 is a view taken along line 12—12 of FIG. 11.
FIG. 13 is a schematic illustration showing a side view of the operation of the spacing fingers of FIG. 11.
FIG. 14 is a schematic illustration showing a plan view of the operation of the spacing fingers of FIG. 11.

As best viewed in FIG. 11, channel wall 98 defines the outboard side of discharge section 44. As discussed above, the rotation of platen 22 conveys caplets 92 toward channel wall 98 during rotation of platen 22.

Dispensing cell 110 includes a pair of spacing fingers 112 and 114 preferably composed of resilient material such as MYLAR synthetic resin material. As best viewed in FIG. 13, fingers 112,114 are formed from a single sheet of material cut and scored to form the configuration illustrated. The sheet is then affixed to channel wall 98 so that fingers 112,114 extend into discharge section 44.

Fingers 112, 114 each presents a planar configuration and includes a first end 116 coupled with channel wall 98 and a distal end 118 positioned in discharge section 44. Each finger 112,114 is positioned generally transverse to platen 18 and includes lower edge 120 adjacent platen 18 as best viewed in FIGS. 12 and 13. Also, fingers 112, 114 are spaced along channel wall 98 and present an obtuse angle relative thereto on the sides of fingers 112,114 opposite outlet 50.

Each finger 112, 114 presents a height greater than the thickness of a caplet 92 and includes a notch 122 defined in lower edge 120. Notch 122 is positioned adjacent distal end 118 and presents a height greater than the thickness of one caplet 92 but less than the height of two caplets.

FIGS. 13 and 14 illustrate the operation of fingers 112, 114. Specifically FIG. 13 is a side elevational view looking toward channel wall 98 with caplets 92 being conveyed from right to left. FIG. 14 is a top plan view of fingers 112, 114 in the same orientation as FIG. 11. Each of FIGS. 13 and 14 illustrate a sequence of events from left to right of caplets 92 being conveyed toward outlet 50. The rotation of platen 18 conveys caplets 92 toward channel wall 98. A caplet so conveyed, first encounters spacing finger 112. The obtuse angle of finger 112 results in caplets being guided along the face thereof toward distal end 118. At distal end 118, a caplet 92 encounters notch 122 and passes therethrough.

The left most illustration in FIGS. 13 and 14 shows two caplets stacked one upon the other encountering finger 112. Only the lower most caplet can pass through notch 122 because the height of notch 122 is less than the height of two caplets but great enough to allow one caplet to pass. As a result, the distal end of finger 112 gently blocks the uppermost caplet causing it to fall onto platen 18 as shown in the center illustration in FIGS. 13 and 14. This action causes the caplets to separate into a single file arrangement shown by the rightmost illustration in FIGS. 13 and 14. This process is repeated at spacing finger 114 to further ensure separation of the caplets into a single file arrangement before discharge at outlet 50. In this way, caplets 92 are spaced and arranged in a single file configuration by the presence of fingers 112, 114.

The resilient nature of spacing fingers 112, 114 ensures gentle contact with caplets 92 to prevent damage thereto. Also, the presence of fingers 112, 114 increases the effective length of the track that caplets must follow before arriving at outlet 50, which also aids in ensuring single file arrangement of the caplets upon reaching outlet 50. As will be appreciated, one spacing finger may be sufficient for some types of medicaments and in other cases more than the preferred two fingers may be advantageous. Also, fingers 112, 114 can be composed of a wide variety of materials and present different configurations.

As will now be appreciated, the present invention provides a distinct advance in the state of the art. The features discussed above effectively eliminate jamming and breakage of medicament units while, at the same time, ensuring dispensing of medicament units one at a time for increased accuracy. Moreover, with these advances, the rotational speed of platen 22 can be increased leading to faster dispensing of medicament units.

Those skilled in the art will appreciate that the present invention encompasses many variations in the preferred embodiment described herein. Having thus described the preferred embodiments of the present invention, the following is claimed as new and desired to be secured by letters patent:

What is claimed is:

1. In an automatic medicament dispensing machine, a dispensing cell for dispensing units of medicament comprising:

a housing having walls defining a storage section, a discharge section leading to an outlet, and a passage between said sections;

a rotatable platen forming at least a portion of the bottom wall of said sections and passage, and operable to convey medicament units during rotation thereof from said storage section to said outlet by way of said passage and discharge section, the dispensing machine including means for selectively rotating said platen, said walls including a channel wall defining a portion of said discharge section, said platen being operable during rotation to convey medicament units toward said channel wall and toward said outlet; and a spacing finger having one end adjacent said channel wall and having a distal end positioned in said discharge section, said finger being configured to guide medicament units away from said channel wall and around said distal end in order to space said medicament units in said discharge sections during rotation of said platen.

2. The dispensing cell of claim 1, said one end of said spacing finger being coupled with said channel wall.

3. The dispensing cell of claim 1, said finger being composed of resilient material.

4. The dispensing cell of claim 3, said resilient material including synthetic resin film.

5. The dispensing cell of claim 1, said finger being resilient and presenting a planar configuration orienting generally transverse to said platen and having a lower edge positioned adjacent to said platen, presenting a height at least as great as the thickness of a medicament unit, and being oriented at an obtuse angle relative to said channel wall on the side of said finger opposite said outlet.

6. The dispensing cell of claim 5, said finger presenting a height greater than the thickness of a medicament unit, and having a notch defined in the lower edge thereof, said notch presenting an open area having a height greater than the thickness of the medicament unit and less than the thickness of two medicament units in order to allow passage of only one medicament unit at a time through said notch.

7. The dispensing cell of claim 6, said notch being positioned adjacent said distal end.

8. The dispensing cell of claim 7 including a plurality of said spacing fingers spaced along said channel wall.

9. The dispensing cell of claim 7 including a pair of said spacing fingers spaced along said channel wall.

10. The dispensing cell of claim 1 including a plurality of said spacing fingers spaced along said channel wall.

* * * * *